United States Patent [19]

Sonneveld

[11] Patent Number: 5,368,952
[45] Date of Patent: Nov. 29, 1994

[54] METAL SUSPENSION HALF-CELL FOR AN ACCUMULATOR, METHOD FOR OPERATING SUCH A HALF-CELL AND METAL SUSPENSION ACCUMULATOR COMPRISING SUCH A HALF-CELL

[75] Inventor: Pieter J. Sonneveld, Helmond, Netherlands

[73] Assignee: Stork Screens B.V., Boxmeer, Netherlands

[21] Appl. No.: 897,237

[22] Filed: Jun. 11, 1992

[30] Foreign Application Priority Data

Jun. 12, 1991 [NL] Netherlands .................. 9101015
Apr. 21, 1992 [NL] Netherlands .................. 9200717

[51] Int. Cl.$^5$ ............................................ H01M 2/38
[52] U.S. Cl. ...................................... 429/67; 429/241
[58] Field of Search .................... 129/67, 81, 241

[56] References Cited

U.S. PATENT DOCUMENTS

| | | | |
|---|---|---|---|
| 2,448,052 | 8/1948 | Roberts | 136/24 |
| 3,870,564 | 11/1975 | Takamura et al. | |
| 3,985,581 | 10/1976 | Stacharski et al. | 429/67 X |
| 4,126,733 | 11/1978 | Doniat | 429/12 |
| 4,172,924 | 10/1979 | Warszawski | 429/15 |
| 4,312,931 | 1/1982 | Witherspoon et al. | 429/229 |
| 4,341,847 | 7/1982 | Sammells | 429/27 |
| 4,948,682 | 8/1990 | Sonneveld | 429/67 |
| 5,006,424 | 4/1991 | Evans et al. | 429/81 X |

FOREIGN PATENT DOCUMENTS

| | | | |
|---|---|---|---|
| 532658 | 10/1983 | Australia . | |
| 118135 | 9/1984 | European Pat. Off. . | |
| 330290 | 8/1989 | European Pat. Off. | H01M 4/66 |
| 94216 | 12/1972 | Germany | H01M 7/00 |
| 2347273 | 3/1974 | Germany . | |
| 1242577 | 8/1971 | United Kingdom . | |

OTHER PUBLICATIONS

A. Marshall, N. A. Hampson and J. S. Drury, The Discharge Behaviour of the Zinc Air Slurry Cell, Nov. 11, 1974, pp. 33-40.
A. Marchall and N. A. Hampson and J. S. Drury, The Anodic Behaviour of Zinc in Flowing Electrolyte Systems, Sep. 26, 1974, pp. 19-32.
European Search Report for E.P. Application No. 92 20 1511 Dated: Dec. 29, 1992.
Extended Abstracts, vol. 88, No. 2, Oct. 8, 1988, Princeton, N.J., US.
Jasinski et al., "A Zinc Paste Primary Battery", Journal of the Electrochemical Society, vol. 130, No. 3, pp. 539-542, Mar. 1983.
Jindra, "Sealed Nickel-Zinc Cells" *Journal of Power Sources* vol. 37, pp. 297-313 (1992).
Hampson et al., "The Electrochemistry of Porous Zinc V. The Cycling Behaviour of Plain and Polymer--Bonded Porous Electrodes in KOH Solutions" *J. of Power Sources*, vol. 15, pp. 261-285 (1985).
Project Summary Reports 1978-1979 Near-Term Battery Programs: Nickel-Zinc Batteries.
Wagner et al. "Substitutes for Mercury in Alkaline Zinc (List continued on next page.)

*Primary Examiner*—Stephen Kalafut
*Attorney, Agent, or Firm*—Deveau, Colton & Marquis

[57] ABSTRACT

A metal suspension half-cell for an accumulator is described, in which the metal suspension, consisting of metal particles and an electrolyte, has been stabilised by adding additive particles which comprise a ceramic material which promotes chain formation in the suspension. As a result of the said chain-forming ceramic material, the metal suspension can be operated essentially stationary within the half-cell. Diverse special geometries of the half-cell are illustrated. As a result of the composition of the suspension and the cell design, an increased cyclability of the cell is obtained. A method for operating a metal suspension half-cell according to the invention during charging/discharging thereof and a metal suspension accumulator which comprises a half-cell according to the invention are also described.

20 Claims, 5 Drawing Sheets

OTHER PUBLICATIONS

Batteries" *Proc. 27th Power Sources Symp.* (1976), pp. 135–138.

Eisenberg et al. "New Stabilized Chemistry Nickel–Zinc Cells for Underwater Applications" *31st Power Sources Symp.* (1984) pp. 265–270.

Adler et al. "Improvements to the Cycle Life Performance of the Zn/KoH/NiOOH Cell" *A.I.A.A.* pp. 1097–1101 (1987).

Gagnon "Effects of KOH Concentration on the Shape Change and Cycle Life of Zn/NioOOH Cells" Journal of Electrochem. Soc. vol. 133 pp. 1989–1995 (Oct. 1986).

Eisenberg et al., "Performance of Vented and Sealed Nickel–Zinc Cells of a New Stabilized Chemistry" *Proc. 32nd Power Sources Symp.* (1986) pp. 439–444.

MacArthur, "Progress in Development of Zinc/Nickel Oxide Cells with Pasted-Rolled Electrodes" *Proc. 20th Intersoc. Energy Conversion Eng.* (1985) vol. 2, pp. 27–33.

Bronoel et al. "Development of NI–Zn Cells" *J. of Power Sources* vol. 34, pp. 243–255 (1991).

McLarnon et al. "The Secondary Alkaline Zinc Electrode" *J. Electrochem. Soc.* vol. 138, pp. 645–664 (Feb. 1991).

Duffield "The Current State of Secondary Nickel–Zinc Technology at LRC" *Chemistry and Industry*, Feb. 1988, pp. 88–91.

Reisner et al., "Recent Progress in the New Stabilized Nl–Zn Battery System: A Current Status Report", *Proc. Intersoc.* Energy Convers. Conf. 25th (vol. 3) pp. 372–377 (1990).

Reisner et al. "A Safe Long-Life High Energy Stabilized Nickel–Zinc Rechargeable Battery" *3rd Proc.* 24th Intersoc. Energy Conversion Eng. Conf., pp. 1677–1682 (1983).

Biegler et al. "Accelerated Testing of Additives in Zinc Plates of Nickel–Zinc Cells" *J. Electrochem. Soc.* vol. 130 pp. 2303–2309 (1983).

Deutschler et al. "Further Work or Additives in the Zinc Plates of Nickel/Zinc Test Cells" *J. of Power Sources* vol. 11, pp. 7–10 (1984).

51 52 53 54 55 56 57

61 62 63 64 65 66

71 72 73 74 75 76 77 78

METAL SUSPENSION HALF-CELL FOR AN ACCUMULATOR, METHOD FOR OPERATING SUCH A HALF-CELL AND METAL SUSPENSION ACCUMULATOR COMPRISING SUCH A HALF-CELL

BACKGROUND OF THE INVENTION

The invention relates primarily to a metal suspension half-cell for an accumulator at least comprising a housing for enclosing an electrolyte-containing suspension, an electrode in contact with the suspension and a membrane which can form a partition with a second half-cell which it is desired to cause to interact with the metal suspension half-cell in order to form an accumulator, the suspension also comprising additive particles in addition to metal particles of a selected metal and electrolyte.

A metal suspension half-cell of this type is disclosed in Netherlands Laid-Open Patent Application 75 08697.

The said publication describes a metal suspension half-cell in which a metal suspension, for example containing zinc, is incorporated and the structure of the metal constituent in the suspension corresponds to the maximum geometrical stacking of the grains or approaches this, while the amount of electrolyte in the suspension is essentially equal to the amount necessary to fill the spaces between the metal particles and to obtain ion transfer.

The suspension thus described in this publication has more the character of a paste and therefore has a relatively high viscosity.

In the half-cell which is described in this publication the viscous paste is allowed to circulate through the half-cell using a transporting electrode, such as a screw. In order to lower the power for driving the screw, additive particles in the form of a lubricant are also added to the paste to facilitate pumping through the half-cell; the lubricant can be in the form of polytetrafluoroethylene or graphite. With regard to the addition, it is stated that this has no influence on the ion exchange.

The stability of the suspension is ensured by the virtually dense stacking of the metal particles, so that settling thereof is prevented.

As a result of the presence of a relatively small amount of fluid electrolyte in relation to the amount of material in particle form, saturation of the electrolyte with zincate will occur relatively rapidly in the case of a zinc suspension accumulator containing a basic electrolyte. As a result of such saturation, the current-supplying capacity of the accumulator will decrease relatively rapidly over time.

The aim of the present invention is to provide a metal suspension half-cell of the type described with which, on the one hand, a good stability of the suspension is guaranteed and, on the other hand, a larger amount of electrolyte can be present so that a greater amount of material formed during discharge of the half-cell can be dissolved.

A further aim of the invention is to provide a half-cell of the type described in which circulation of the suspension is no longer necessary.

SUMMARY OF THE INVENTION

According to the invention, the metal suspension half-cell of the indicated type is, to this end, characterised in that the additive particles comprise at least one ceramic material which promotes chain formation in the suspension within the half-cell and in that the suspension is essentially stationary during charging and/or discharging.

It has been found that as a result of the addition of ceramic materials which promote chain formation in the suspension within the half-cell a very high stability of the metal suspension is obtained, so that settling is prevented, while, moreover, as will also be discussed, it is found that the chain formation is accompanied by an increased charge transfer between the metal particles and therefore a lower resistance of the metal suspension.

With regard to the ceramic material, many examples are, of course, known; the ceramic material can be chosen from natural and synthetic ceramic materials and the additive particles preferably comprise one or more gel-forming, water-insoluble clay minerals.

For a review of clay minerals which can be used, reference is made here to A. B. Searle; R. W. Grimshaw; The Chemistry and Physics of Clay, page 890; Ernest Benn Limited; London, 1960.

Suitable additive particles comprise a clay mineral chosen from hallosite, sepiolite and palygorskite (attapulgite).

As will be discussed below, additive particles consisting of clay mineral in an aqueous electrolyte, for example a basic electrolyte, can be in three states:
 a. in the form of free discrete particles,
 b. in the form of agglomerates, and
 c. in the form of chains.

Free particles will in general be found in those cases where a relatively low concentration of material in particle form is introduced into a liquid containing a low electrolyte concentration.

Agglomeration of particles occurs when the van der Waals attraction between the particles is greater than the electrostatic repulsion between the particles, as in the case of a high electrolyte concentration.

For specific types of particles and under specific conditions in respect of dimension, shape, surface charge and electrolyte concentration, chain formation will occur between the particles and a gel will be formed.

The Applicant has now found that a stable metal particle suspension can be formed, which therefore displays no or few settling phenomena, if a metal concentration which is lower than in the publication discussed above is accompanied by the presence of an amount of ceramic material, in particular a clay mineral, the particles of which, together with the relevant metal particles and the electrolyte used in the suspension result in chain formation within the half-cell.

When the ceramic materials indicated above which promote chain formation are used, the suspension is found to be stable to such an extent that it is possible to dispense with stirring of the suspension in order to prevent settling phenomena, while the saturation of the electrolyte with discharge products, which has been described above and inhibits charge exchange, has little influence on the current-supplying capacity of the half-cell. These various features are associated with the fact that in the metal suspension half-cell according to the invention, an appreciably lower metal particles concentration in the suspension can suffice because of the presence of one or more ceramic materials promoting chain formation.

In the Dutch publication described above, the metal concentration in the suspension at which a maximum geometrical stacking of the grains occurs is said to be a critical composition; a concentration of 27% by volume of zinc and 3% by volume of polytetrafluoroethylene in a 10 MKOH electrolyte for a zinc particle size of a few microns is given as an example.

The abovementioned value of 27% by volume of zinc is, of course, dependent on the particle size and the particle size distribution.

It has now been found that in the metal suspension half-cell according to the present invention, a stable metal suspension can be formed within a broad range of 5 to 40% by volume of metal particles and of 0.1 to 5% by volume of additive particles, a greater solubility of products formed during discharge therefore being possible as a result of the large amount of liquid electrolyte present, so that the metal suspension half-cell can be more deeply discharged.

It is also possible with the metal suspension half-cell according to the invention to achieve a higher energy density (that is to say amount of energy per unit weight of the accumulator), with a lower metal concentration, in an accumulator which comprises such a half-cell than in accumulators according to the abovementioned prior art.

In an advantageous embodiment of the metal suspension half-cell according to the invention, the additive particles comprise a ceramic material having the second specific characteristic that it counteracts self-discharge of the metal particles of the suspension by the electrolyte.

Self-discharge of the metal particles is understood to be a self-discharge phenomenon of the metal particles in an electrolyte, for example the conversion of zinc into zinc oxide in an alkaline electrolyte.

The self-discharge can be quantified by measuring the evolution of hydrogen in a stored metal suspension in an alkaline electrolyte, in particular a zinc suspension.

It has been found that many ceramic materials, of natural or synthetic nature, counteract the corrosion of the metal particles in the suspension; a pronounced effect is displayed by boron carbide ($B_4C$), titanium nitride (TiN), zirconium nitride (ZrN), sepiolite, sentonine, attapulgite, zinc oxide or mixtures of two or more of these materials.

By means of a suitable choice of additive particles, therefore, both a stable suspension and stability to self-discharge will be obtained; an amount of 1.0 to 10% by volume of additive particles for a suspension which comprises 1 to 30% by volume of metal particles, the remainder consisting of electrolyte, will give rise both to the said chain formation and to the said corrosion inhibition if sepiolite or palygorskite is used.

In the case where the metal particles in the suspension consist of zinc, a small amount of zinc oxide will always be present on the zinc particles and/or in the electrolyte; it has been found that, for example, the combination of palygorskite (attapulgite) and zinc oxide has an exceptionally good effect in terms of counteracting self-discharge.

The metal of the metal particles can be chosen from zinc, cadmium, iron and lead; zinc is preferred.

The following composition may serve as an example of a composition in a zinc suspension half-cell:

15% by volume of zinc,
5.0% by volume of palygorskite,
KOH+LiOH (for example 8 molar KOH and 0.6 molar LiOH in the electrolyte).

In the Dutch publication discussed above, a dense stacking is dependent on the particle size of the metal suspension; in general, a relatively narrow particle size distribution will be chosen in order to obtain a reproducible result.

It has been found that in the metal suspension half-cell according to the present invention, a greater freedom exists in the choice of the particle size and particle size distribution to be used in the metal suspension; it has been found that metal powders having a very broad particle size distribution can also be used successfully. It is assumed that the lastmentioned fact is associated with the fact that the stability of the suspension is no longer dependent on geometrical stacking effects but, since the stability is associated with chain formation, on the presence of chain formation-promoting ceramic materials, such as clay minerals, in the suspension.

When a metal suspension half-cell according to the invention is used in which the suspension within the metal suspension half-cell is kept essentially stationary, that is to say is essentially immobile with respect to the electrode, excellent discharge and charge characteristics are obtained.

In an advantageous embodiment of the metal suspension half-cell according to the invention, said half-cell comprises transport means for removing at least part of the suspension which is located in the metal suspension half-cell and for supplying a replacement amount of suspension; transport means of this type expediently comprise one or more compartments.

Especially when the metal suspension half-cell is used as part of an accumulator for traction purposes, it can be advantageous, following a discharge period, to replace the amount of suspension present in the active part of the half-cell in a single operation by an amount of fresh suspension (that is to say suspension in the charged, active state), and to remove the (spent) suspension from the active part of the half-cell.

A removal and supply of this type can be achieved by installing a transport system within the half-cell; to this end, one or more compartments are expediently present in the transport means, it being possible for one or a number of compartments together to have a volume which corresponds to the effective volume of the metal suspension half-cell.

The materials which can be used in the metal suspension half-cell can be the conventional materials; the electrode can, for example, consist of stainless steel.

It has been found that good results are also obtained when the material used as electrode possesses a high overvoltage against metal build-up on the surface thereof; examples of such materials are boron carbide, magnesium, glassy carbon, zirconium nitride and vanadium. It is also advantageous if the surface of such an electrode is highly polished.

By means of the material choice indicated above and the surface nature of said material, the formation of a solid metal precipitate on the electrode during charging of the metal suspension half-cell is prevented, which is also beneficial for the subsequent discharge characteristics.

The metal suspension half-cell according to the invention can be of diverse types; in the simplest form, the half-cell comprises a compartment in which an amount of metal suspension is present and which contains an electrode; the compartment is closed off by a membrane which can be connected to a second half-cell in order to form an accumulator consisting of two half-cells.

A small number of advantageous embodiments of a metal suspension half-cell according to the invention which have specific advantages compared with the abovementioned general type will now be described below.

Firstly, the volume of the metal particle suspension in the metal suspension half-cell according to the invention can take up only part of the volume of the half-cell and can be separated from the other part of the half-cell by gauze material which has mesh openings which are essentially smaller than the size of the smallest metal particles in the suspension.

A cell of this type can withstand a large number of discharge cycles without an appreciable reduction in the capacity.

The abovementioned gauze material is preferably electrically conducting metal gauze so that the metal gauze can act as a conductor in the half-cell.

Instead of separating the metal particle suspension from the other part of the half-cell by, for example, metal gauze material, it is also possible to apply the zinc particles, using impregnation techniques, inside a metal foam material, such as, for example, a copper foam material. In place of a foam material, it is also possible to use a metal nonwoven, that is to say a metal wire mass which has been packed together to form a self-supporting whole.

In a particular embodiment, the metal particles of the suspension are confined within a cage of metal gauze which is arranged at a distance from the membrane of the half-cell.

In another embodiment the metal particles of the suspension are confined in a space which is delimited on one side by the membrane of the half-cell and on the other side by a metal gauze electrode, that is to say the metal particles of the suspension are in direct contact with the membrane.

In yet another embodiment the metal particles of the suspension are confined in a space which is delimited by a metal gauze on one side and by an auxiliary membrane on the side facing towards the membrane, and the space between the auxiliary membrane and the membrane is filled with a suspension of a ceramic material which additionally comprises an oxidising substance and/or a substance promoting corrosion of the metal particles, and the auxiliary membrane is impermeable to the metal particles of the suspension and the solid material present in the space delimited by the auxiliary membrane and the membrane.

By incorporating an oxidation-promoting substance and/or a corrosion-promoting substance (catalyst) in the space which is delimited by the membrane and the auxiliary membrane, any metal dendrites formed during charging are electrochemically dissolved again, as a result of which these dendrites can not grow through the membrane and penetrate into the other half-cell interacting with the metal suspension half-cell. The number of cycles of the accumulator is appreciably influenced as a result.

Examples of oxidising substances which may be mentioned are manganese dioxide, nickel oxyhydroxide (NiOOH) and silver nickel oxide ($AgNiO_2$). Examples of a corrosion-promoting substance are copper, nickel, niobium nitride or tungsten carbide particles. It is also possible to add one of the abovementioned ceramic materials; the ceramic material is preferably palygorskite (attapulgite).

The invention also relates to a method for operating a metal suspension half-cell in a charging and/or discharging process, wherein, for charging, current is supplied to a metal suspension half-cell according to the invention as described above, in order to form metal from reaction products which have formed during previous discharging, or current is withdrawn from the metal suspension half-cell during discharging.

As indicated above, in the metal suspension half-cell according to the invention, following discharge, at least part of the metal suspension is advantageously replaced by essentially the same amount of a previously charged suspension.

Finally, the invention relates to a metal suspension accumulator which comprises one or more assemblies of half-cells which are separated by a membrane, which metal suspension accumulator is characterised in that one of the metal suspension half-cell of each assembly is a metal suspension half-cell from those which have been described above and which form part of the invention.

To form an accumulator, a metal suspension half-cell according to the invention can be combined with a suitable second half-cell; to this end, use can be made of many existing half-cells.

A suitable half-cell is, for example, an air or oxygen half-cell; preferably, a half-cell of this type comprises a gas electrode which is a bipolar oxygen electrode, so that both charging and discharging can take place using the same gas electrode.

The second half-cell can also comprise a nickel oxyhydroxide electrode which is in contact with a basic electrolyte.

With regard to the clay minerals to be used according to the invention, as summarised above, a clay mineral having a particle size of at most 25 micrometers, for example 0.5–2 micrometers, will preferably be used; the concentration is from 1 to 10% by volume, preferably 5% by volume, based on the total volume of the suspension.

BRIEF DESCRIPTION OF THE DRAWINGS

The invention will now be illustrated with reference to the drawing, wherein:

FIG. 1 shows a half-cell according to the invention, a housing 1 being present in which an electrode 2 of suitable material is arranged. The half-cell is delimited by a membrane 3, indicated diagrammatically, which at the same time forms the partition with another half-cell 4, which is not shown. The other half-cell 4 can be, for example, an air or oxygen cell with a bipolar oxygen electrode; the second half-cell can also consist of a half-cell which comprises a basic electrolyte in which a nickel oxyhydroxide electrode is arranged.

The metal suspension is indicated by 5 and according to the invention comprises metal particles, such as zinc, electrolyte liquid, for example a mixture of 8 molar KOH and 0.6 molar LiOH, and a chain-forming ceramic material, for example a naturally occurring ceramic material, such as a clay mineral in the form of palygorskite.

Good results are obtained with 15% by volume of zinc (in general 5 to 30% by volume of zinc or another metal), 5.0% by volume of palygorskite (in general 1 to 10% by volume) and an electrolyte such as 8 molar KOH plus 0.6 molar LiOH (in general 5 to 12 molar KOH, 0–1 molar LiOH).

In addition to zinc and palygorskite, the suspension will frequently also contain a small amount of zinc oxide, which is a product which forms during discharge of zinc. As indicated above, the combination of palygorskite and zinc oxide is advantageous in connection with the chain formation-promoting characteristics and corrosion inhibition; zinc oxide may be added specifically if not present.

Figure 2A:
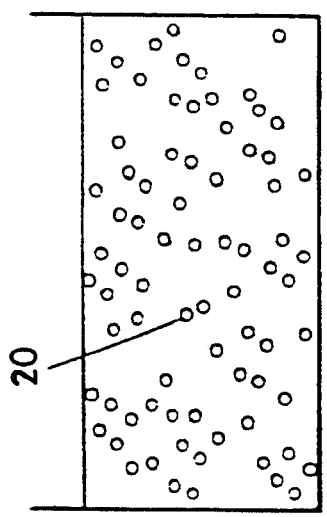
FIGS. 2a, 2b and 2c show the possible grouping state of ceramic particles in an electrolyte.

FIG. 2A shows, diagrammatically, a dilute dispersion of ceramic particles 20 in an alkaline electrolyte, for example palygorskite in a potassium hydroxide solution of relatively low concentration (for example 1 molar KOH).

Figure 2B:
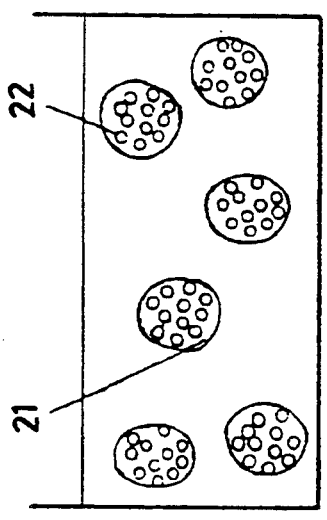

If the electrolyte concentration is allowed to increase substantially, the situation as shown in FIG. 2B arises; agglomeration of the particles 22 occurs and there is little or no interaction between the agglomerates 21.

Figure 2C:
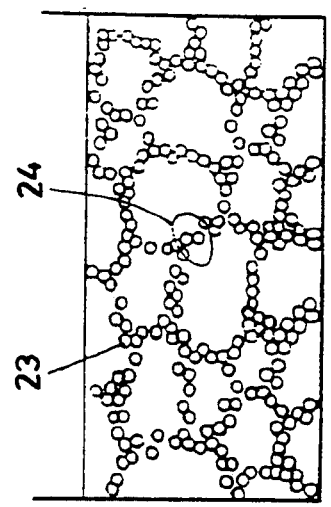

FIG. 2C shows the situation where palygorskite or any other suitable chain-forming clay mineral has been incorporated in an electrolyte solution of moderate concentration; for example 8 molar KOH. The mutual electrostatic repulsion is then not sufficient to overcome the van der Waals attraction; particle bridge formation is then promoted, as a result of which chain formation occurs the following.

It is this latter condition which, in the present invention, is the aim in respect of the metal suspension used; by adding a chain-forming ceramic material, such as a suitable clay material, a gel is formed in the metal suspension, as a result of which, as will be indicated below, the metal suspension itself is stabilised, that is to say will no longer settle.

Figure 3:
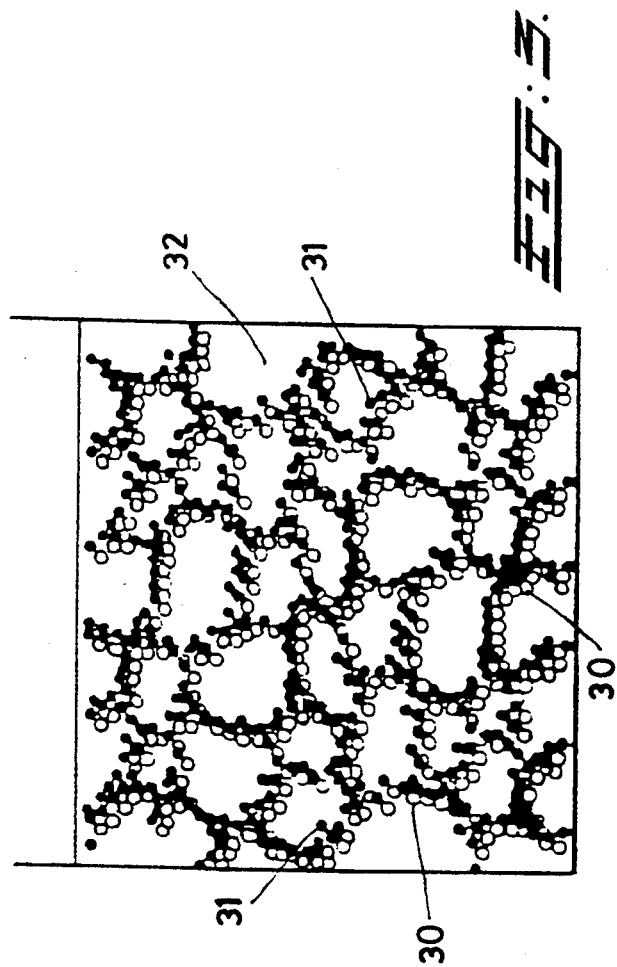
FIG. 3 shows chain formation in a suspension which comprises both metal particles and chain-forming ceramic particles.

The lastmentioned situation is indicated in FIG. 3; it is seen that here ceramic particles 30, such as palygorskite, have formed a three-dimensional structure in the suspension, which behaves as a gel. Zinc particles 31 are bonded to the chains of the structure and are protected against settling by the presence of the lattice structure; the electrolyte, which in this case contains KOH and LiOH, is indicated by 32.

Figure 1:
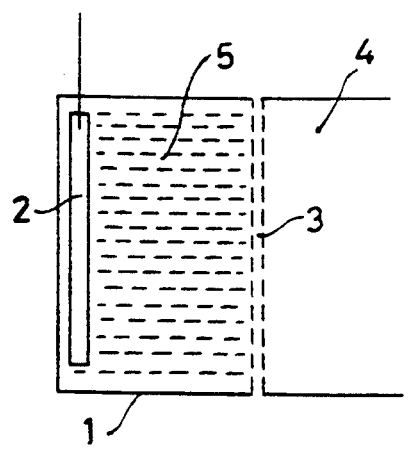
FIG. 1 shows a diagram of the metal suspension half-cell according to the invention.
Figure 4:
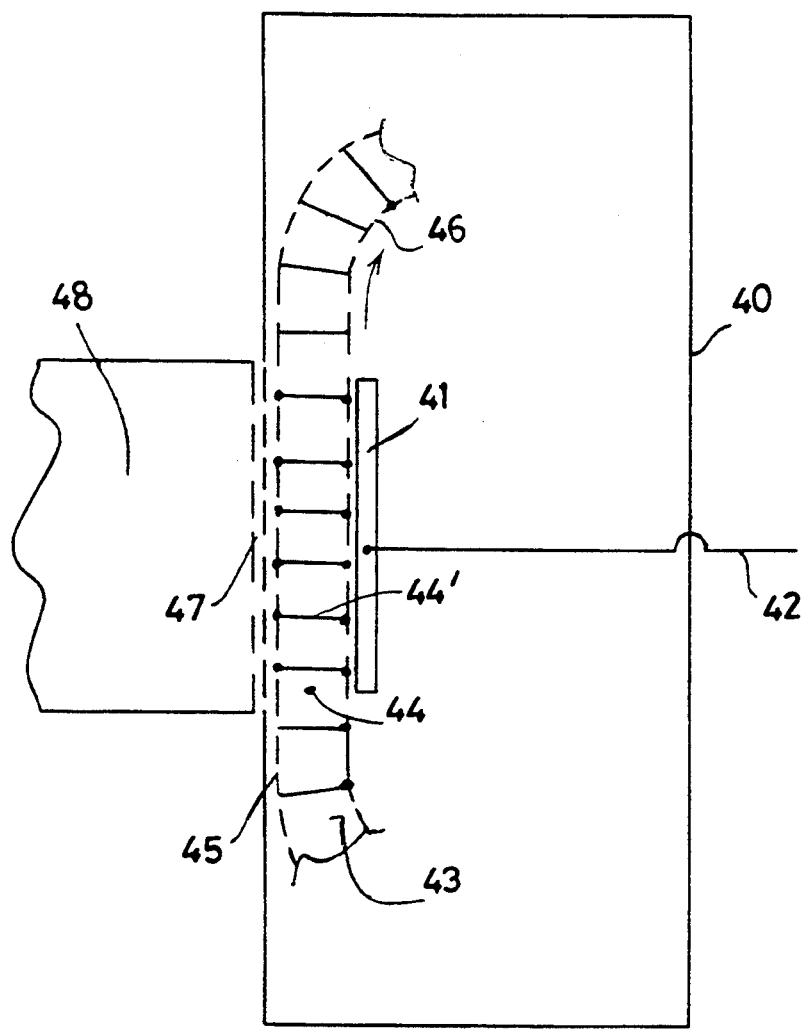
FIG. 4 shows a diagram of a metal suspension half-cell in which a transport system for the metal suspension in an active part of the half-cell is shown.

In FIG. 4 a metal suspension half-cell in which a transport system for the suspension is incorporated is shown diagrammatically.

The metal suspension half-cell comprises a housing 40 and an electrode 41 of suitable material with a connection 42. 47 indicates a membrane which is common with a second half-cell 48, which is not sketched in more detail. In the active part of the metal suspension half-cell according to the invention there is a transport system 43 with compartments 44, which are delimited by partitions 44', which are incorporated between conveyor belts 45 and 46. When discharge of the volume of suspension located opposite the electrode 41 is complete, the transport system can be set in motion in order to supply a fresh amount of suspension located in the other part of the half-cell, so that this suspension takes up the space opposite the electrode 41, an equal volume of suspension being removed at the same time in the direction indicated by the arrow.

Of course, a multiplicity of measures can be taken in the other part of the half-cell in order to ensure that either homogenisation of the suspension takes place by means of mixing; however, it is also possible to withdraw an amount of suspension from the half-cell, which suspension is charged elsewhere, a corresponding amount of freshly charged suspension being added to the half-cell at the same time. It is also possible for the amount of spent suspension removed from the active part of the half-cell to be entirely replaced by a fresh amount. The suspension consisting of metal particles, chain-forming and corrosion-resistant ceramic material and electrolyte is omitted here for reasons of clarity.

Figure 5:
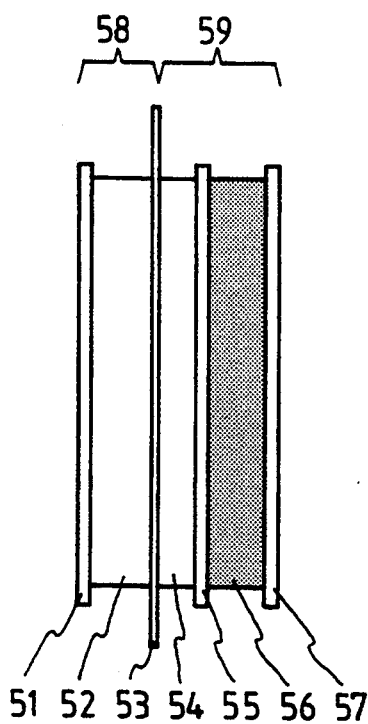
FIGS. 5 to 7 show diverse advantageous embodiments of accumulators comprising two half-cells, one of the half-cells always being a half-cell according to the present invention.
Figure 6:
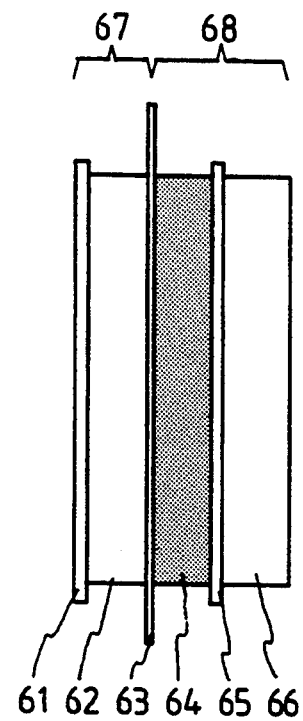
Figure 7:
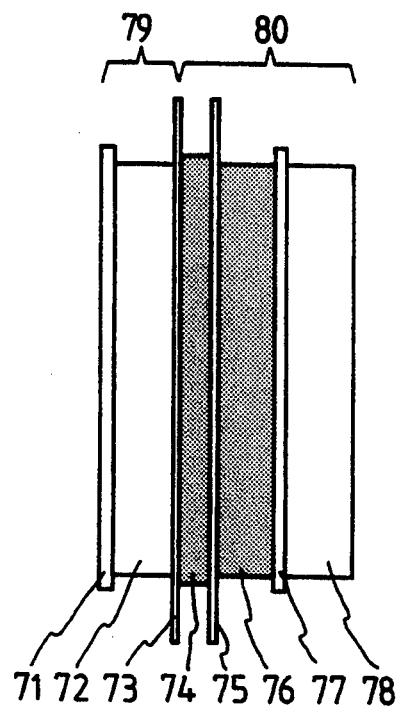

In FIGS. 5, 6 and 7, three accumulators are shown which are indicated somewhat more specifically and which each comprise a metalsuspensions half-cell which is the subject of the present invention.

The arrangement of the various parts of the accumulators relative to one another is indicated diagrammatically in the figures; it is obvious that an accumulator of this type comprises a housing and that short-circuiting between the diverse compartments is prevented because the separating elements drawn in the figures are connected to the housing, which is not drawn here. The figures therefore serve only as an illustration of the concept; a person skilled in the art will easily be able to envisage the measures not shown here, such as housing and connection to the walls thereof.

FIGS. 5 to 7 are based on a metal suspension half-cell according to the invention which comprises a zinc suspension; other metalsuspensions can, of coursed also be used.

In FIG. 5 a nickel oxyhydroxide electrode is indicated as positive electrode 51; 52 indicates a potassium hydroxide solution; 53 is a membrane which separates the two half-cells 58 and 59 of the accumulator.

54 indicates a buffer amount of potassium hydroxide-containing electrolyte and 56 a zinc suspension. As indicated above, the zinc suspension comprises an amount of ceramic material which serves to promote chain formation and to counteract corrosion of the zinc particles. 55 and 57 indicate electrodes which in this case consist of metal gauze and which serve as current collector. The metal gauze can be, for example, copper gauze, the mesh width of the gauze being such that the latter essentially retains the smallest zinc particles. It has been found that the presence of a potassium hydroxide-containing electrolyte buffer between the current collector 55 and the membrane prevents damage to the membrane as a result of dendrite formation.

FIG. 6 shows an accumulator consisting of two half-cells 67 and 68, the half-cell 67 having the same form as the half-cell 58 from FIG. 5.

In this case the membrane 63 is in contact with the zinc suspension 64; on the other side the zinc suspension is delimited by a metal gauze current collector which, in its turn, is delimited by a buffer amount of potassium hydroxide solution. Electrode and potassium hydroxide solution 62 correspond to the electrode 51 and similar solution 52, respectively, of FIG. 5. Likewise, current collector 65 corresponds to similar collector 55 of FIG. 5.

It has been found that this arrangement makes it possible to obtain a larger number of cycles (discharging+-charging), which possibly can be explained by the observation that the zinc grows in the direction of this additional electrolyte reservoir 66, as a result of which the risk of dendrite growth through the membrane is greatly reduced. The current density is lower in this case because a larger proportion of the electrode becomes active as a result of diffusion of zincate from the electrolyte reservoir.

FIG. 7 indicates the situation where two half-cells 79 and 80 form part of an accumulator; half-cell 79 corresponds to half-cell 58 as shown in FIG. 5.

The half-cell 80 comprises a membrane 73 and an auxiliary membrane 75. The space 74 is filled with a suspension of a ceramic material, such as, for example, a palygorskite or attapulgite suspension. This suspension also comprises an amount of oxidising substance, such as manganese dioxide, nickel oxyhydroxide, silver nickel oxide or a substance which substantially promotes the self-discharge of zinc, such as copper, nickel, niobium nitride or tungsten carbide particles. In the event of dendrites growing from the metal suspension space 76 through the auxiliary membrane into the space 74 containing the extra suspension, vigorous self-discharge of the dendritic zinc in the presence of said substances ensures that any dendrites protruding through the auxiliary membrane 75 are dissolved, so that damage to the membrane 73 and penetration to the half-cell 79 is prevented. The result of the measure indicated here is a prolongation of the life (number of cycles). Electrode 71 and potassium hydroxide solution 72 corresponds to the electrodes 51, 61 and similar solutions 52, 62, respectively, of FIGS. 5 and 6, respectively. Likewise, current collector 77 corresponds to similar collectors 55, 65 of FIGS. 5 and 6, respectively, and electrolyte reservoir 78 corresponds to similar reservoir 66 of FIG. 6.

Figure 8:
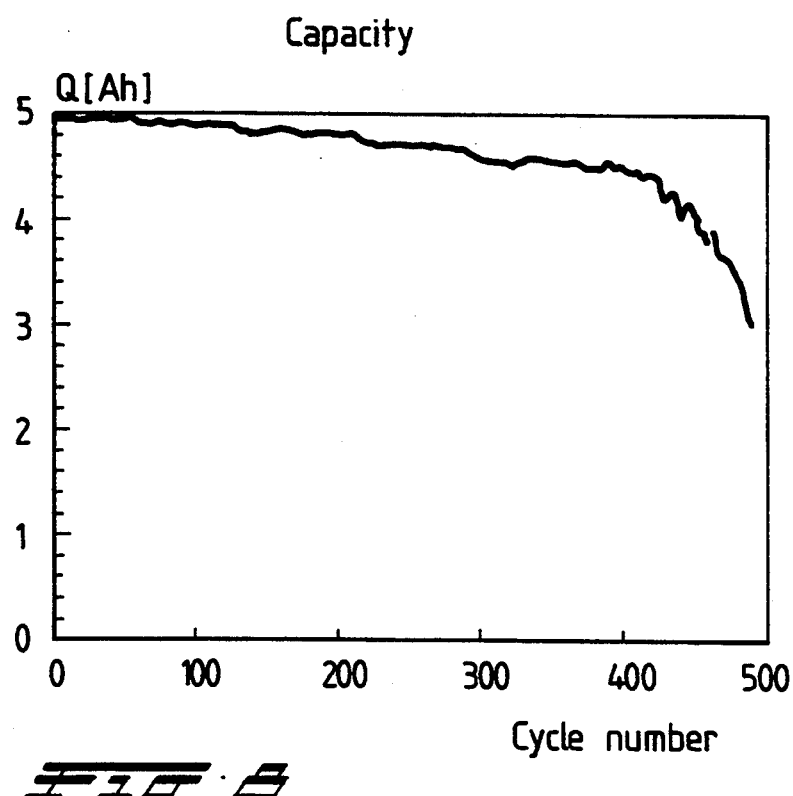
FIG. 8 is a graph which shows the way in which the capacity of an accumulator changes as the number of discharge/charge cycles increases.

FIG. 8 shows a graph in which the capacity of an accumulator according to FIG. 5 is plotted against the number of cycles (charging+discharging) - -, - -; the electrode used was a nickel oxyhydroxide electrode. It is seen that there is an appreciable reduction in the capacity at about 500 cycles.

Figure 9:
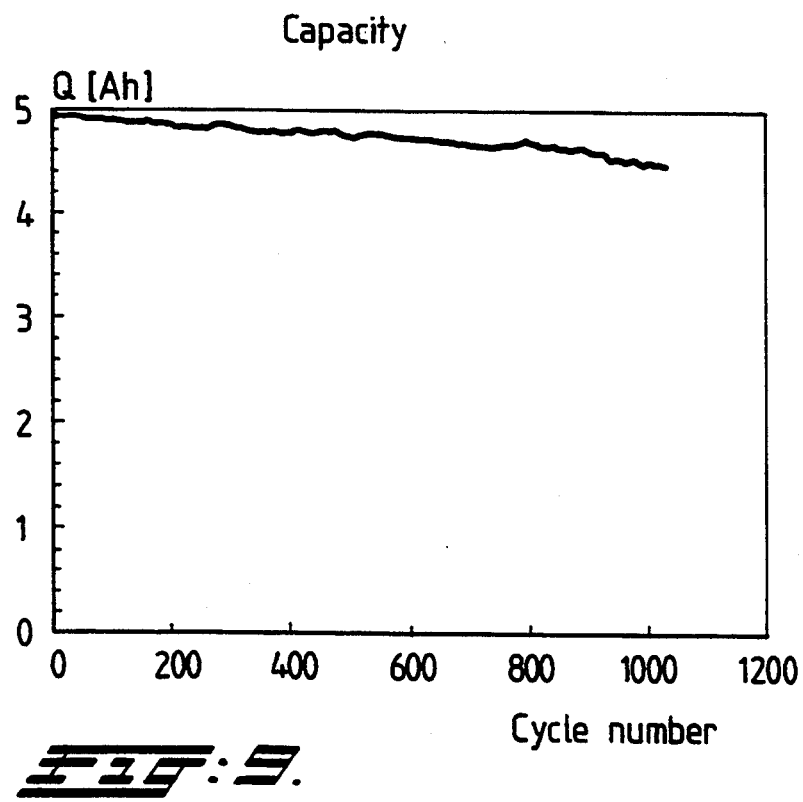
FIG. 9 shows a graph as in FIG. 8 for a half-cell according to the invention in a very advantageous embodiment.

FIG. 9 is a graph as shown in FIG. 8, this graph, however, being plotted for an accumulator as shown in FIG. 6.

It is seen that as a result of the presence of an extra reservoir containing alkaline electrolyte, a significant improvement in the life is achieved, that is to say the capacity declines to a substantially smaller extent than is the case in FIG. 8, which relates to an accumulator according to FIG. 5.

The invention relates to a metal suspension half-cell in which an important element consists of the presence of chain formation-promoting ceramic materials; amongst these it is specifically the water-insoluble, gel-forming clay minerals which show very advantageous examples. One example of a clay mineral which functions very well is palygorskite, which is also known as attapulgite.

When the conductivity of a zinc suspension in which an amount of ceramic material is dissolved is measured, a different conductivity pattern will be detected depending on the chain-forming character of the ceramic material concerned.

Figure 10:
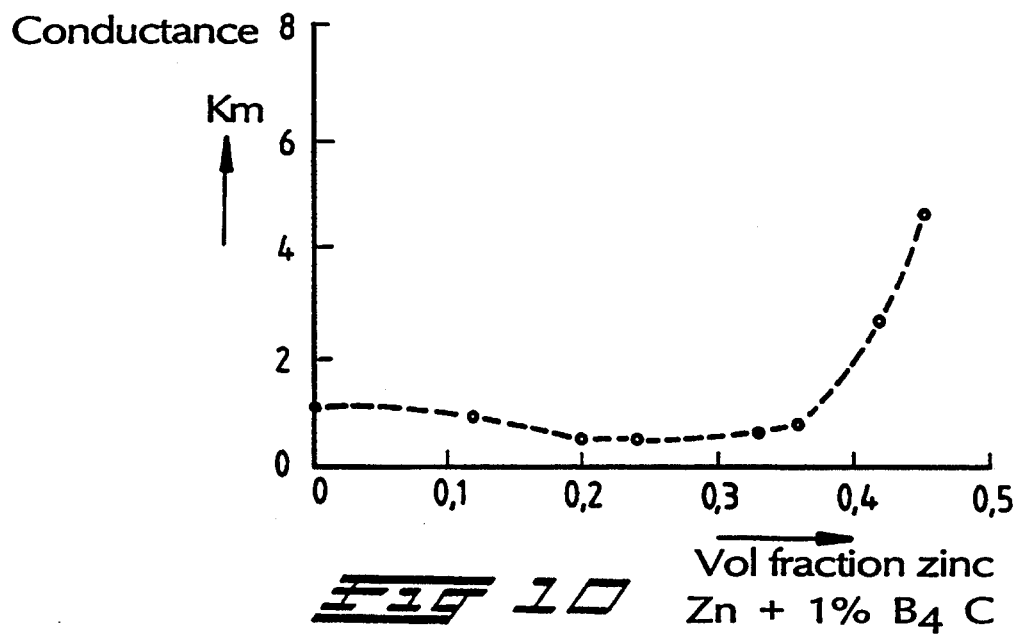
FIG. 10 is a graph which shows the way in which the conductivity changes with increasing zinc concentration in a zinc suspension which is mixed with 1% boron carbide.

FIG. 10 shows the relative conductivity when the volume fraction of zinc is allowed to increase. The zinc suspension used was a suspension to which 1% by volume of boron carbide had been added as additive. The measurement was carried out at 25° C. at very low frequencies (1 Hz).

As can be seen from FIG. 10, in this case a substantial increase in the conductivity is detected only at a relatively high zinc particle concentration. At lower zinc particle concentrations, a decrease in the conductivity can even be seen at first, the conductivity showing an increase only at about 35% by volume of zinc.

Figure 11:
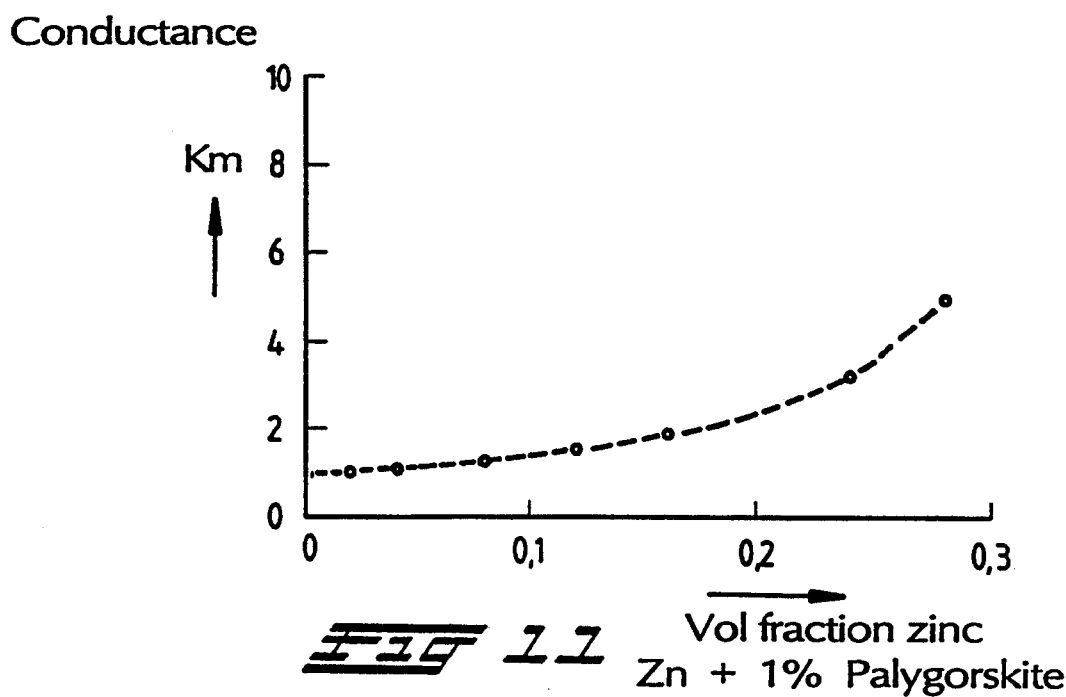
FIG. 11 shows a graph as in FIG. 10, 1% of palygorskite being present in place of boron carbide.

FIG. 11 shows the same situation as in FIG. 10, but the boron carbide has been replaced by 1% by volume of palygorskite.

It can be seen that a continuous increase in the conductivity occurs from very low zinc concentrations; this continuous increase is to be ascribed to the chain-forming character of palygorskite.

In the context of the present application, chain formation can thus also be described as a phenomenon which, when measuring the conductivity in a metal particle suspension, in particular a zinc suspension, in an alkaline electrolyte results in a continuous increase in said conductivity being detected with increasing zinc particles concentration.

As indicated above, specific chain-forming materials also have a very advantageous influence on the self-discharge character of the half-cell according to the invention; palygorskite is one such ceramic material which both displays chain formation and restricts corrosion of the zinc suspension.

What is claimed is:

1. Metal suspension half-cell for an accumulator at least comprising a housing for enclosing an electrolyte-containing suspension, an electrode in contact with the suspension and a membrane which can form a partition with a second half-cell which it is desired to cause to interact with the metal suspension half-cell in order to form an accumulator, the suspension also comprising additive particles in addition to metal particles of a selected metal and electrolyte, wherein the additive particles comprise at least one ceramic material which promotes chain formation in the suspension within the half-cell and in that the suspension is essentially stationary during charging and/or discharging, wherein the ceramic material is chosen from natural and synthetic ceramic materials.

2. A metal suspension half-cell according to claim 1, in which the suspension is incorporated within a coherent metal material selected from the group consisting of metal nonwoven and metal foam material, said metal in the metal material being selected from the group consisting of copper, copper coated with lead, copper coated with cadmium, and copper coated with silver.

3. Metal suspension half-cell according to claim 1, in which the additive particles comprise one or more gel-forming, water-insoluble clay minerals.

4. Metal suspension half-cell according to claim 3, in which the additive particles comprise a clay mineral chosen from halloysite; sepiolite and palygorskite (attapulgite).

5. Metal suspension half-cell according to claim 1 in which the additive particles comprise a ceramic material which counteracts self-discharge of the metal particles of the suspension by the electrolyte, wherein the ceramic material is chosen from boron carbide ($B_4C$), titanium nitride (TiN), zirconium nitride (ZrN), sepiolite, sentonine, attapulgite, zinc oxide or mixtures of two or more of these materials.

6. Metal suspension half-cell according to claim 1, in which the suspension comprises 1–30% by volume of metal particles; 1–10% by volume of additive particles and electrolyte.

7. Metal suspension half-cell according to claim 6, in which the metal of the metal particles is chosen from Zn, Cd, Fe and Pb.

8. Metal suspension half-cell according to claim 6 in which the suspension contains 15% by volume of zinc, 5.0% by volume of palygorskite and an aqueous electrolyte containing KOH and LiOH.

9. Metal suspension half-cell according to claim 1, in which said half-cell comprises transport means for removing at least part of the suspension which is located in the metal suspension half-cell and for supplying a replacement amount of suspension.

10. Metal suspension half-cell according to claim 9, in which the transport means comprise one or more compartments.

11. Metal suspension half-cell according to claim 1, in which the suspension is in contact with an electrode of material which possesses a high overvoltage against metal build-up.

12. Metal suspension half-cell according to claim 11, in which the material of the electrode is chosen from boron carbide, magnesium, glassy carbon, zirconium nitride and vanadium and the surface of the electrode is highly polished.

13. Metal suspension half-cell according to claim 1, in which the metal particle suspension takes up only part of the volume of the half-cell and in that the other part of the half-cell is separated by a gauze material which has mesh openings which are essentially smaller than the dimensions of the smallest metal particles in the suspension.

14. Metal suspension half-cell according to claim 13, in which the gauze material is a metal gauze and acts as current conductor in the half-cell.

15. Metal suspension half-cell according to claim 14, in which the metal particles are confined within a cage of metal gauze which is arranged at a distance from the membrane of the half-cell.

16. Metal suspension half-cell according to claim 14, in which the metal particles are confined in a space which is delimited by the membrane of the half-cell and a metal gauze electrode.

17. Metal suspension half-cell according to claim 14, in which the metal particles are confined in a space which is delimited by a metal gauze on one side and by an auxiliary membrane on the side facing towards the membrane, and the space between the auxiliary membrane and the membrane is filled with a suspension of a ceramic material which additionally comprises an oxidising substance and/or a substance promoting corrosion of the metal particles, and the auxiliary membrane is impermeable to the metal particles of the suspension and the solid material present in the space delimited by the auxiliary membrane and the membrane.

18. Metal suspension half-cell according to claim 17, in which the oxidising substance is chosen from $MnO_2$, NiOOH and $AgNiO_2$ and the corrosion-promoting substance from Cu, Ni, NbN or WC.

19. A Method for operating a metal suspension half-cell for an accumulator in a charging and/or discharging process, said accumulator at least comprising a housing for enclosing an electrolyte-containing suspension, an electrode in contact with the suspension and a membrane which can form a partition with a second hall-cell which it is desired to cause to interact with the metal suspension hall-cell in order to form an accumulator, said suspension also comprising additive particles in addition to metal particles of a selected metal and electrolyte, wherein the additive particles comprise at least one ceramic material which promotes chain formation in the suspension within the hall-cell and in that the suspension is essentially stationary during charging and/or discharging, wherein the ceramic material is chosen from natural and synthetic ceramic materials.
  (a) wherein, during the charging process, current is supplied to a metal suspension hall-cell, in order to form metal from reaction products which have formed during previous discharging of the metal suspension hall cell;
  (b) and during the discharging process current is withdrawn from said metal suspension hall-cell so that, in which, following discharge, at least part of the suspension in the metal suspension hall-cell is replaced by essentially the same amount of a previously charged suspension.

20. A metal suspension accumulator which comprises at least one assembly of half-cells in which one of the hall-cells of each assembly is a metal suspension hall-cell and the other hall cell is a second hall cell which it is desired to cause to interact with the metal suspension half-cell in order to form said accumulator, said metal suspension hall-cell at least comprising a housing for enclosing an electrolyte-containing suspension, an electrode in contact with the suspension, and a membrane which can form a partition between the metal suspension hall-cell and second hall-cell, said metal suspension also comprising additive particles in addition to metal particles of a selected metal and electrolyte, wherein the additive particles comprise at least one ceramic material which promotes chain formation in the suspension within the hall-cell and in that the suspension is essentially stationary during charging and/or discharging, wherein the ceramic material is chosen from natural and synthetic ceramic materials.

* * * * *